April 29, 1930.  C. M. HART  1,756,193
APPARATUS FOR MOLDING PLUGS AND THE LIKE
Filed Oct. 15, 1927   3 Sheets-Sheet 1
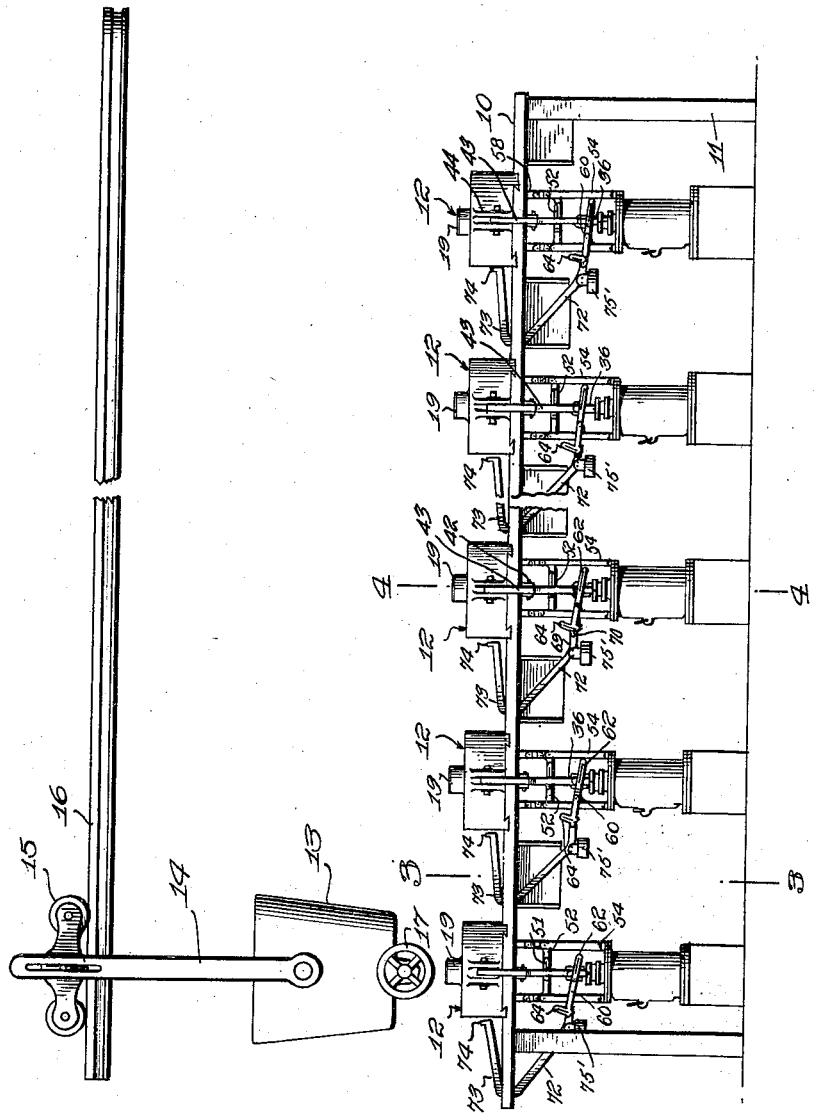
Inventor
C. M. HART
By C. M. Darlien
Attorney April 29, 1930. C. M. HART 1,756,193
APPARATUS FOR MOLDING PLUGS AND THE LIKE
Filed Oct. 15, 1927 3 Sheets-Sheet 2
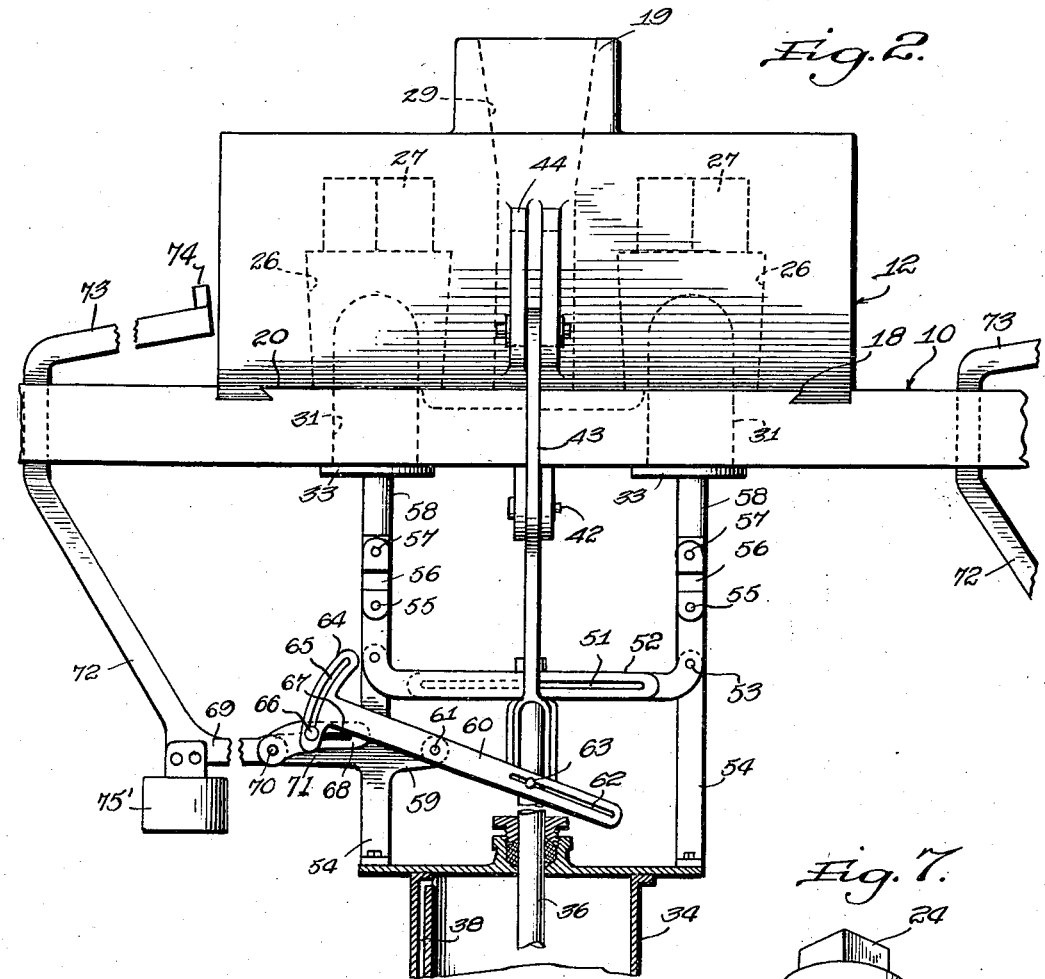
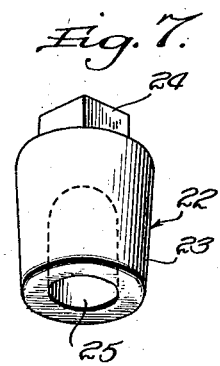
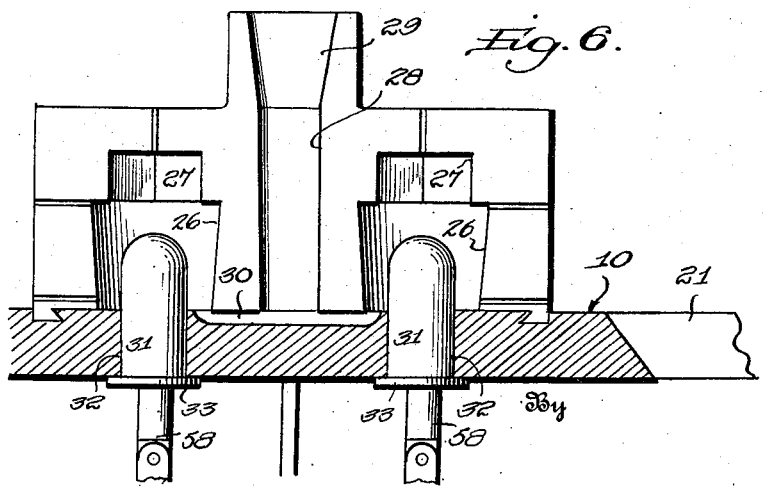
Inventor
C. M. HART April 29, 1930.  C. M. HART  1,756,193
APPARATUS FOR MOLDING PLUGS AND THE LIKE
Filed Oct. 15, 1927  3 Sheets-Sheet 3
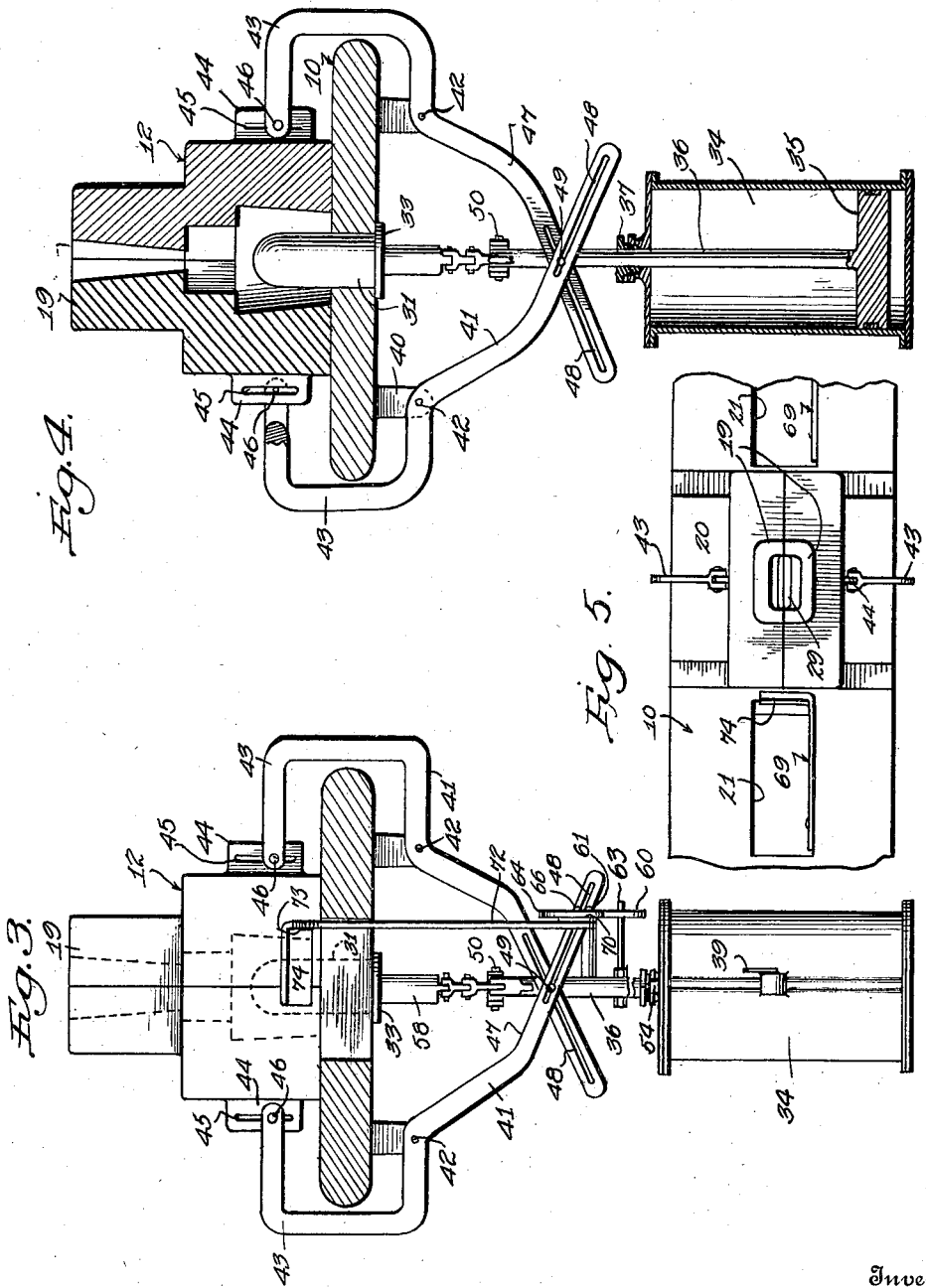

Patented Apr. 29, 1930

1,756,193

UNITED STATES PATENT OFFICE

CHARLES MARVIN HART, OF WAYCROSS, GEORGIA

APPARATUS FOR MOLDING PLUGS AND THE LIKE

Application filed October 15, 1927. Serial No. 226,475.

This invention relates to molding apparatus and more particularly to an apparatus for molding articles such as the clean-out plugs of locomotive boilers.

An important object of the invention is to provide an apparatus which is adapted for the cheap and rapid manufacture of locomotive clean-out plugs.

A further object is to provide a mold structure wherein the articles are adapted to be rapidly cast and removed from the mold to permit rapid successive molding operations to take place.

A further object is to provide novel means for ejecting the finished articles from the mold.

A further object is to provide a mold having a pair of relatively movable sections adapted to be brought together during the molding operation and to be separated to permit removal of the finished articles.

A further object is to provide a mold of the character referred to including a core adapted to project into the mold whereby hollow articles may be formed, the core being movable out of the mold to permit the finished articles more readily to be removed therefrom.

A further object is to provide novel operating means for the movable elements of the apparatus.

A further object is to provide a stationary base forming a part of the mold and defining the bottoms of the finished articles and over which the relatively movable mold sections are arranged, the base being provided with an opening through which the finished articles are adapted to be discharged.

Other objects and advantages of the invention will become apparent during the course of the following description.

In the drawings I have shown one embodiment of the invention. In this showing,

Figure 1 is a side elevation showing the molds arranged in series together with charging means therefor.

Figure 2 is a side elevation of a portion of the apparatus, parts being shown in section, Figure 3 is a section on line 3—3 of Figure 1, Figure 4 is a similar view on line 4—4 of Figure 1, Figure 5 is a fragmentary plan view, Figure 6 is a section on line 6—6 of Figure 3, and, Figure 7 is a detail perspective view of one of the finished molded articles.

Referring to Figure 1, the numeral 10 designates a preferably integral horizontal base supported by suitable legs 11. The base is adapted to support a plurality of molding units each of which is indicated as a whole by the numeral 12. As indicated, a series of the molding units preferably are employed, and these units may be arranged in a single row or in a plurality of rows. Suitable means is provided for charging the molds with molten metal or other material from which the articles are to be formed. As shown, a ladle 13 is arranged above the molds and is connected to a pair of depending arms 14 having wheels 15 at their upper ends adapted to travel upon rails 16. The ladle is provided with a valve (not shown) adapted to be controlled by a suitable operating wheel or handle 17 to discharge the molten metal into the successive molds. When the molds are arranged in a single row it will be apparent that a single straight rail 16 is arranged above the molds and parallel thereto. When a plurality of rows of molds is employed, it also will be apparent that corresponding rails 16 are used, and alternate ends of the rails may be connected by curved sections to permit the ladle to travel throughout the length of each row of molds.

Referring to Figures 2, 3, 4 and 6, the numeral 18 designates a dovetail guide provided for each of the molding units 12. Each of these units includes a pair of movable sections 19 which coact with each other and with the base to form a complete mold, and each mold section is provided in its bottom portion with a cut-out 20 to receive the dovetail 18 whereby it will be apparent that the mold sections are adapted to partake of linear movement toward and away from each other. When the mold sections are moved apart a sufficient distance in a manner to be described, the finished articles are adapted to be ejected therefrom and to fall downwardly through suitable openings 21 formed in the base 10.

In the present instance, the molds are illustrated as being adapted to cast clean-out plugs 22, as shown in Figure 7 of the drawings, the plug including a slightly tapered body 23 and a polygonal wrench engaging head 24. For a purpose to be described, the plug is provided with a central recess 25 which is adapted to be formed in a manner to be referred to later. In order to form the article described, the mold sections are provided with complementary slightly tapered cut-out portions 26 and upper cut-out portions 27, the former defining the tapered body of the plugs and the latter the polygonal heads thereof. Each molding unit is illustrated as being adapted to form a pair of the plugs at each casting operation, and centrally of their length, the mold sections are provided with complementary grooves 28 forming a passage for the molten metal and enlarged at their upper ends as at 29 to facilitate the pouring of the metal into the mold. The passage for the molten metal communicates at its lower end with a groove 30 formed in the upper face of the base 10 and each end of the groove 30 communicates with one of the mold cavities.

As previously stated, means is provided for forming the recesses 25 in each of the finished plugs. As shown, a plunger 31 is adapted to project upwardly into each mold cavity through an opening 32 formed in the base 10. The upper end of each plunger may be curved as shown in Figure 6, or may be otherwise shaped if desired. A lower flange 33 is carried by each plunger and is adapted to seat against the lower face of the base 10 to limit the upward movement of the plunger, and when the latter is in the position shown in Figure 6 it will be apparent that it acts as a core to form a hollow plug when the molten metal is poured into the mold.

A cylinder 34 is arranged beneath each molding unit and is provided with a piston 35 connected to an upwardly extending piston rod 36. This rod preferably operates through a suitable packing gland 37 provided in the upper end of the cylinder. Fluid pressure is adapted to be supplied to opposite ends of the cylinder 34 through passages 38, the flow of the fluid pressure being controlled by a manually operable valve 39. Referring to Figures 3 and 4, the numeral 40 designates a pair of depending bearings carried by the base 10 beneath each of the molding units. An arm 41 is pivotally connected to each bearing 40 as at 42 and is provided with a portion 43 extending around and over the base 10 to a point adjacent one of the mold sections 19. Each of these sections is provided with a pair of outstanding vertical ears 44 provided with slots 45 and a pin 46 is adapted to slide in the slots of each pair of ears. Each pin 46 is connected to the upper and inner ends of one of the levers 41. Each of these levers is provided at its lower end with an arm 47 arranged to one side of the piston rod 36, and is provided with a slot 48 through which passes a pin 49 carried by the piston rod.

Referring to Figure 3, the numeral 50 designates a second pin carried by the piston rod 36 and extending at right angles to the pin 49. The ends of the pin 50 operate in slots 51 formed in bell crank levers 52, these levers being pivoted as at 53 to upstanding supports 54 which may be mounted on the upper end of the cylinder 34 (see Figure 2). At its other end, each lever 52 is pivotally connected as at 55 to one end of a link 56, and the other end of this link is pivotally connected as at 57 to the lower end of a depending extension 58 formed on one of the plungers 31.

One of the supports 54 is provided with an inwardly projecting extension 59 in which a lever 60 is pivotally connected as at 61. The inner end of this lever is provided with a slot 62 in which a pin 63 is slidable, this pin being carried by the piston rod 36. The opposite end of the lever 60 is provided with a laterally extending head 64 having a slot 65 formed therein and receiving a floating pin 66. This pin also is slidable in a slot 67 formed in the inner end 68 of a lever 69, and the latter is pivotally connected as at 70 to an extension 71 also formed on the support 54 last referred to. The lever 69 extends outwardly and then upwardly as at 72, and the upper end 73 of the lever extends inwardly toward the molding unit and is provided with a transversely extending head 74. The lever is preferably provided outwardly of the pivot 70 with a weight 75' tending to hold the lever in the normal position shown in Figure 2. The upwardly extending portion of the lever is arranged in one of the openings 21, as shown in Figure 5. The end 74 of the lever 69 is adapted to remove or eject articles from the mold to permit the articles to fall downwardly through the opening 21 on the opposite side of the mold and if desired, a collecting trough 75 may be arranged below each opening 21.

The operation of the apparatus is as follows:

It will be obvious that a single mold may be employed, or the molds may be arranged in rows as previously stated. With the piston 35, associated with each mold unit, arranged in the lower or retracted position as shown in Figure 4, the mold will be closed and the plunger 31 will be arranged in operative position, whereby the mold will be ready to receive a charge of molten metal or other material. It also will be apparent that the lever 69 will be arranged in the position shown in Figure 2 with the upper end thereof wholly removed from the associated molding unit. The ladle 13 is moved successively to positions over the molds and the valve thereof is operated to admit charges to the mold. The molten material flows downwardly through the passages 29 and 28, and thence outwardly to the mold cavities through the passages 30 formed in the base 10. After the material has set and hardened, the valve 39 may be operated to admit fluid pressure to the bottom of the cylinder 34, thus elevating the piston 35. This action swings the lower ends of the levers 41 upwardly, the upper end of the levers moving outwardly to separate the mold sections 19. While this action is taking place, it will be apparent that the inner ends of the levers 52 will swing upwardly and the outer ends of these levers will pull the links 56 and the plungers 31 downwardly to release the plungers from the molded articles. An initial elevation of the piston also swings the lever 60 upwardly, but lost motion is provided by the arrangement of the pin 66 in the slot 65, and accordingly the lever 69 will not be operated until the mold sections have been withdrawn a sufficient distance to permit the transverse end 74 of the lever 69 to pass between the molds. When the pin 66 reaches the upper end of the slot 65, movement will be imparted to the lever 69 and due to the relative lever lengths between the ends of the lever 69, the projecting end 74 thereof will move rapidly across the base 10 between the mold sections, thus pushing the finished article across the base to permit it to fall downwardly through the adjacent opening 21. After the article has been ejected, the parts are returned to normal position by reversing the valve 39 to admit fluid pressure to the top of the cylinder.

The use of the plunger 31 forms a hollow finished article as shown in Figure 7, the article being particularly adapted for use as a clean-out plug for locomotive boilers. It is the present practice to make such plugs solid with the result that they become heated more slowly than the surrounding portions of the boiler thus causing leakage past the threads provided on the plug. It accordingly is necessary to make the plugs relatively long to permit them to be tightened as the boiler becomes heated to prevent the leakage referred to. With the present construction, the plugs are made relatively light, the mass of the plugs being reduced by the provision of the recesses 25. The walls of the plug thus are relatively thin, and when the plugs are threaded into their respective openings, they become rapidly heated substantially at the same rate as the surrounding portions of the boiler, thus equalizing the expansion of the plugs and the boiler walls and preventing leakage. For the reasons referred to, the plug may be made shorter, and this fact together with the fact that the plug is hollow, results in a great saving of metal thus permitting the plugs to be manufactured more economically than the present types.

The apparatus described is particularly adapted for the manufacture of the plugs referred to, and the molds are quickly operable to cast successive plugs thus economizing in the manufacture of these devices.

It is to be understood that the form of the invention herewith shown and described is to be taken as a preferred example of the same and that various changes in the shape, size and arrangement of parts may be resorted to without departing from the spirit of the invention or the scope of the subjoined claims.

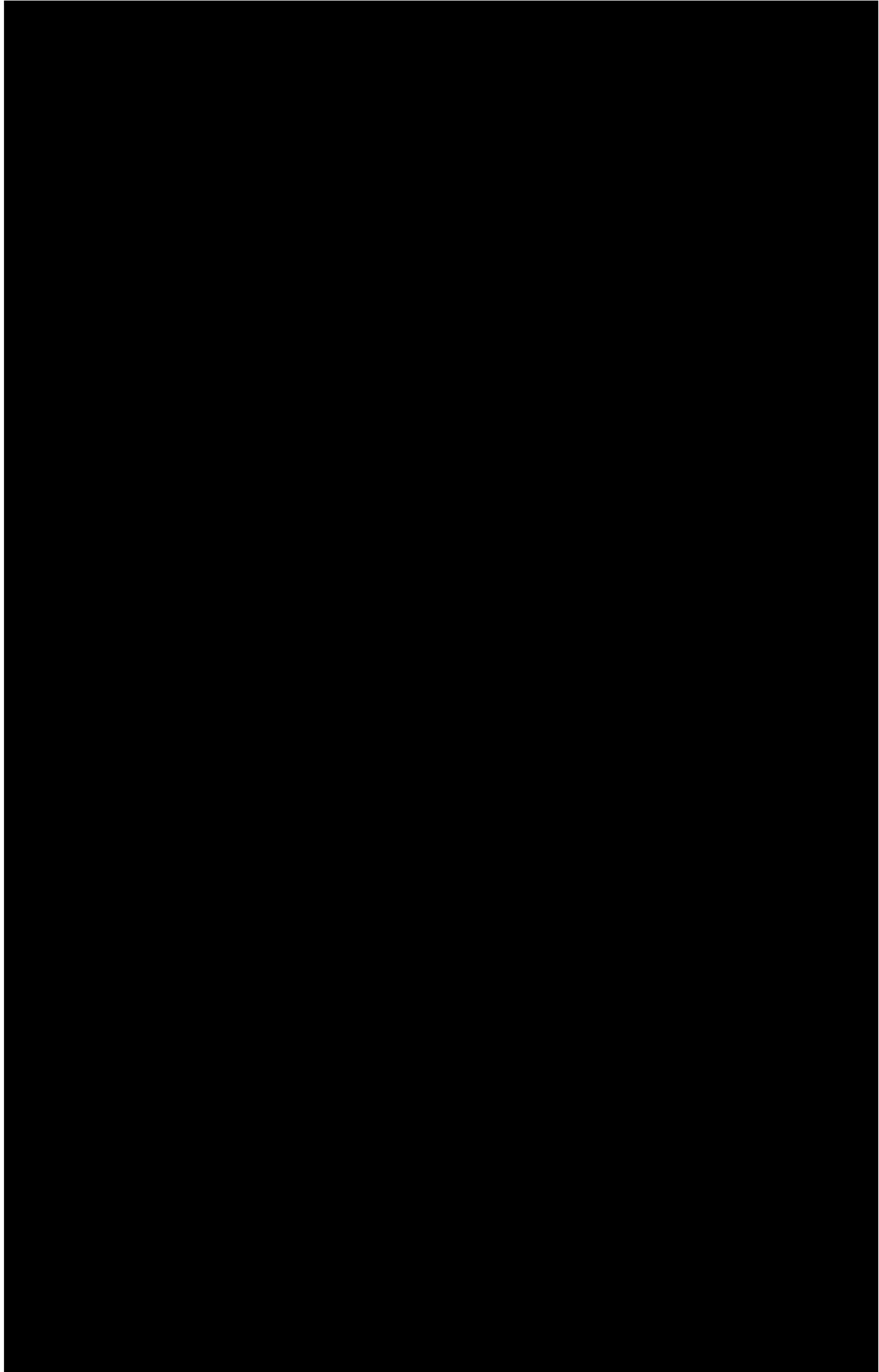

I claim:

1. Molding apparatus comprising a molding unit including a pair of sections provided with a mold cavity, a base forming the bottom of said unit and supporting said sections for movement toward and away from each other, said base being provided with an opening communicating with said cavity, and a core slidably mounted in said opening and normally projecting into said cavity.

2. Molding apparatus comprising a molding unit including a pair of sections provided with a mold cavity, a base forming the bottom of said unit and supporting said sections for movement toward and away from each other, said base being provided with an opening communicating with said cavity, a core slidably mounted in said opening and normally projecting into said cavity, and means for retracting said core from said cavity to permit finished articles in said unit to slide on said base between said sections.

3. Molding apparatus comprising a horizontal base provided with an opening, a pair of relatively movable complementary mold sections arranged on said base, a retractable core slidably mounted in said opening and normally arranged within said mold, a cylinder, a piston mounted to reciprocate in said cylinder and provided with a piston rod projecting from one end thereof, a pair of levers pivotally supported intermediate their ends and connected at one end to each of said sections, and connections between said piston rod and the opposite ends of said levers.

4. Molding apparatus comprising a horizontal base provided with an opening, a pair of relatively movable complementary mold sections arranged on said base, a retractable core slidably mounted in said opening and normally arranged within said mold, a cylinder, a piston mounted to reciprocate in said cylinder and provided with a piston rod projecting from one end thereof, a pair of levers pivotally supported intermediate their ends and connected at one end to each of said sections, connections between said piston rod and the opposite ends of said levers, and means connected between said piston rod and said core for retracting the latter from said mold.

5. Molding apparatus comprising a molding unit including a pair of complementary sections, a base forming the bottom of said